US012679283B2

(12) United States Patent
Brutsaert

(10) Patent No.: US 12,679,283 B2
(45) Date of Patent: Jul. 14, 2026

(54) BICYCLE CARRIER

(71) Applicant: PROSTOR BV, Kortrijk (BE)

(72) Inventor: Sofie Brutsaert, Kortrijk (BE)

(73) Assignee: PROSTOR BV, Kortrijk (BE)

( * ) Notice: Subject to any disclaimer, the term of this patent is extended or adjusted under 35 U.S.C. 154(b) by 134 days.

(21) Appl. No.: 18/621,420

(22) Filed: Mar. 29, 2024

(65) Prior Publication Data

US 2024/0326708 A1 Oct. 3, 2024

(30) Foreign Application Priority Data

Mar. 30, 2023 (BE) .................................... 20235245

(51) Int. Cl.
| | |
|---|---|
| *B60R 9/10* | (2006.01) |
| *B60R 9/06* | (2006.01) |
| *B62H 3/08* | (2006.01) |
| *B62H 3/10* | (2006.01) |

(52) U.S. Cl.
CPC .................. *B60R 9/10* (2013.01); *B60R 9/06* (2013.01); *B62H 3/08* (2013.01); *B62H 3/10* (2013.01)

(58) Field of Classification Search
CPC .... B60R 9/10; B60R 9/06; B62H 3/08; B62H 3/10
See application file for complete search history.

(56) References Cited

U.S. PATENT DOCUMENTS

| | | | | |
|---|---|---|---|---|
| 3,720,333 A | * | 3/1973 | Vaughn | B60R 9/10 224/528 |
| 4,275,981 A | | 6/1981 | Bruhn | |
| 5,190,195 A | | 3/1993 | Fullhart | |
| 5,456,564 A | * | 10/1995 | Bianchini | B60R 9/06 224/508 |
| 5,462,398 A | * | 10/1995 | Hymer | B60R 9/10 414/537 |
| 5,676,292 A | * | 10/1997 | Miller | B60R 9/06 224/524 |
| 6,139,247 A | * | 10/2000 | Wright | B60R 9/06 414/470 |
| 8,047,412 B2 | | 11/2011 | Premartin | |
| 11,447,076 B1 | * | 9/2022 | Mercurio | B60R 9/06 |
| 11,572,022 B2 | | 2/2023 | Owen et al. | |
| 12,221,074 B2 | * | 2/2025 | Morrill | B60R 9/06 |
| 2002/0154980 A1 | | 10/2002 | Potts | |
| 2003/0082034 A1 | * | 5/2003 | Barrett | B60P 3/07 414/462 |

(Continued)

FOREIGN PATENT DOCUMENTS

| | | |
|---|---|---|
| DE | 4424226 A1 | 1/1996 |
| EP | 1245448 B1 | 12/2005 |

*Primary Examiner* — Brian D Nash
(74) *Attorney, Agent, or Firm* — Dinsmore & Shohl LLP

(57) ABSTRACT

A bicycle carrier having coupling means for mounting to a vehicle, a hinge shaft which, at a distance from the geometric centre of gravity of the coupling means, is connected to the coupling means; a bicycle support which can hinge around the hinge shaft between, on the one hand, a load position whereby a free end of the bicycle support faces towards the ground and, on the other hand, a transport position whereby the aforementioned free end of the bicycle support faces away from the ground; whereby the bicycle carrier is provided with locking means for locking the rotation of the bicycle support in the transport position.

16 Claims, 11 Drawing Sheets

(56)  References Cited

U.S. PATENT DOCUMENTS

| | | | |
|---|---|---|---|
| 2004/0004099 A1* | 1/2004 | Crouch | B60R 9/10 |
| | | | 224/504 |
| 2006/0231581 A1* | 10/2006 | Jones | B60R 9/10 |
| | | | 224/403 |
| 2008/0142559 A1* | 6/2008 | Lim | B60R 9/10 |
| | | | 224/489 |
| 2008/0206031 A1* | 8/2008 | Butta | B66D 3/02 |
| | | | 254/323 |
| 2008/0290627 A1 | 11/2008 | Gilbert | |
| 2024/0010136 A1* | 1/2024 | Kuschmeader | B60R 9/10 |
| 2024/0075885 A1* | 3/2024 | Stahl | B60R 9/06 |
| 2025/0018873 A1* | 1/2025 | Weinert | B60R 9/06 |
| 2025/0187549 A1* | 6/2025 | Falk | B60R 9/10 |

* cited by examiner

BICYCLE CARRIER

CROSS-REFERENCE TO RELATED APPLICATION

This application claims priority to Belgium Patent Application No. 2023/5245 filed on Mar. 30, 2023, incorporated herein by reference in its entirety.

TECHNICAL FIELD

The present disclosure relates to a bicycle carrier.

The present disclosure more specifically relates to a bicycle carrier for mounting on a vehicle such as a mobile home, caravan, car or the like, but is not limited to this.

Where reference is made to a bicycle carrier in this document, this also relates, among others, to racks for other two-wheelers and alternatively also for other forms of luggage, trunks and the like.

BACKGROUND

Typically, bicycle carriers are mounted on the towbar or a fixed location at the back against the vehicle or sometimes also at the front on top of the drawbar in the case of towed vehicles such as caravans and trailers. For loading and unloading the bicycles on and off the bicycle carrier the bicycles must be lifted, which can be heavy, particularly when it relates to electric bicycles.

Furthermore, this implies that such bicycle carriers are mounted relatively low to the ground to make loading and unloading easier. However, this is not safe to drive and also increases the potential risk of theft.

Such bicycle carrier may also form an obstacle for accessing the luggage or engine compartment or block the view through a window or block the view of the licence plate and indicators, such that additional provisions are required for auxiliary lights and an extra licence plate that is then mounted on the bicycle carrier.

Furthermore, it is not always possible to mount such bicycle carrier in the most suitable location due to the presence of a bumper, a window, a door, a spare wheel or the like.

The traditional bicycle carriers for mounting to a vehicle comprise coupling means intended for attaching against the vehicle and a load-bearing structure. Said load-bearing structure is provided with one or several guides that extend in a parallel way to a wall of the vehicle. Said guides are intended to support the bicycle under the tyres of the bicycle.

When the bicycle carrier is not loaded, typically the load-bearing structure is folded up towards the vehicle.

The purpose of the present disclosure is to provide a solution to the aforementioned.

SUMMARY

To this end, the present disclosure relates to a bicycle carrier, comprising coupling means for mounting to a vehicle, whereby the bicycle carrier is further provided with:
  a hinge shaft which, at a distance D from the geometric centre of gravity of the coupling means, is connected to the coupling means;
  a bicycle support which can hinge around the hinge shaft between, on the one hand, a load position whereby a free end of the bicycle support faces towards the ground and, on the other hand, a transport position whereby the aforementioned free end of the bicycle support faces away from the ground;
  whereby the bicycle carrier is provided with locking means for locking the rotation of the bicycle support in the transport position and whereby the hinge shaft is located on a first side at the distance D from the virtual vertical plane that extends in a parallel way to the hinge shaft and through the geometric centre of gravity of the coupling means, and the free end of the load-bearing structure which in the load position faces towards the ground is located on a second side of the virtual vertical plane through the geometric centre of gravity of the coupling means.

The major aspect of a bicycle carrier according to the present disclosure is that the bicycles do not have to be lifted onto the bicycle support.

Because the free end of the bicycle support can be tilted towards the ground and possibly make contact with the ground, the bicycle can be ridden onto the bicycle support in an easy manner without having to lift the bicycle.

After riding the bicycle onto the bicycle support, the bicycle support can be tilted back such that the bicycle support is located substantially horizontally.

In such a way bicycles can be very quickly and easily loaded onto the bicycle carrier without lifting the bicycles.

Apart from the convenience and the time saved, a user also has ergonomic aspects. Particularly when loading heavy electric bicycles, the improved ergonomics are exceptional.

The aforementioned distance D ensures that the bicycle carrier in both the transport position and in the load position, as much as possible and, in embodiments, completely, remains within the dimensions of a wall of the vehicle.

It is understood that the aforementioned distance D between the geometric centre of gravity of the coupling means and the hinge shaft extends in the longitudinal direction of the bicycle support or is parallel with the wall of the vehicle.

According to the present disclosure the hinge shaft is located on a first side at the distance D from the virtual vertical plane that extends parallel to the hinge shaft and through the geometric centre of gravity of the coupling means, and the free end of the load-bearing structure which in the load position faces towards the ground is located on a second side of the virtual vertical plane through the geometric centre of gravity of the coupling means.

The aspect provides a smaller incline and thus more comfort when loading. Indeed, a smaller incline simplifies putting the bicycles onto the load-bearing structure.

Said incline is related to the aforementioned distance D between the coupling means and the hinge shaft between the load-bearing structure and arm.

The greater the aforementioned distance D, the smaller the incline of the bicycle support in the load position can remain and the simpler it is to put or ride the bicycles onto the bicycle support.

Furthermore, the greater the aforementioned distance D, the higher the bicycle carrier can be mounted at the same incline.

This means the position of the attachment of the bicycle carrier to the coupling means is exceptionally flexible.

Another aspect of the position of the hingeable connection according to the present disclosure is that bicycles can be placed higher. Indeed, the greater the aforementioned distance D, the higher the bicycle carrier can be mounted at the same incline.

In embodiments, the hinge shaft can be provided on or be part of a frame that is connected to the coupling means. The bicycle support may then comprise one or more rails which are hingeably applied in the frame and can hinge around the hinge shaft between the load position and the transport position.

Said rails are for example U-shaped rails, but alternatively can also be ramps or the like.

In embodiments, the hinge shaft is connected to the coupling means by an arm. In that case the bicycle support comprises a load-bearing structure that can hinge around the hinge shaft between the load position and the transport position. In that case too the load-bearing structure can be provided with one or more rails or guides for guiding and supporting the wheels of the bicycle(s).

Apart from substantially horizontal, the plane formed by the bicycle support can also be at a slight incline in the transport position. In embodiments, said incline is less than 15°, less than 10°, or less than 5° relative to the horizontal.

In this way the bicycles can be transported in a safe and orderly way, whereby the wheels of the bicycle are sufficiently supported.

In embodiments, the incline of the plane formed by the bicycle support in the load position is less than 60°, less than 50°, or less than 40° relative to the horizontal.

Naturally, said angle varies with the height at which the bicycle carrier is mounted. The smaller the incline between the plane formed by the bicycle support and the horizontal or ground, the simpler it is to ride the bicycles onto the bicycle support.

Said incline is related to the aforementioned distance D between the coupling means and the hinge shaft.

The greater the aforementioned distance D, the smaller the incline of the bicycle support in the load position can remain and the simpler it is to put or ride the bicycles onto the bicycle support.

Furthermore, the greater the aforementioned distance D, the higher the bicycle carrier can be mounted at the same incline.

This means the position of the attachment of the bicycle carrier to the coupling means is exceptionally flexible.

In embodiments, the position where the bicycle support is connected to the frame or the arm can be shifted or modified in the direction of the coupling means.

This aspect provides that the distance D between the bicycle support and the coupling means can be varied. This may be handy when, for example, a bicycle or two-wheeler with wide handlebars must be transported.

In embodiments, the position where the frame or the arm is connected to the coupling means is slideable or variable in the longitudinal direction of the frame or the arm.

This aspect provides that the width of the bicycle carrier can be made smaller when mounted on a narrow vehicle. By changing the position of the frame or the arm it is also possible to ensure in this way that the frame or the arm and the bicycle support do not block a luggage compartment or window or the like.

In other words the dimensions of the bicycle carrier can be flexibly set in accordance with the user's optimum convenience.

In embodiments, the frame or the arm is provided with a stop such that the rotation of the bicycle support in the load position and/or transport position is limited.

The rotation of the bicycle support in the transport position is particularly important. In embodiments, the bicycle support reaches the stop when the plane formed by the bicycle support extends substantially horizontally.

In embodiments, the load-bearing structure is provided with one or more guides that extend parallel to each other for guiding and supporting the wheels of the bicycles.

Although the number of guides is unlimited in theory, in practice the number of guides will usually vary between one and four guides. The most common variant is equipped with two guides.

In any case, each guide is intended for guiding one bicycle or two-wheeler. A bicycle carrier with three guides will thus be able to transport maximum three bicycles at the same time.

In embodiments, the frame or the aforementioned arm are hingeably connected to the coupling means between, on the one hand, the transport position, and on the other hand, a compact position whereby the bicycle support is tilted in the direction of the coupling means or in the direction of the vehicle.

In that case, the plane formed by the bicycle support will extend substantially in the vertical plane in the compact position. However, it is not excluded that the angle between the plane formed by the bicycle support and the vertical is less than 30°, less than 15°, or ideally less than 5°.

In embodiments, the bicycle support or the aforementioned guides or rails are provided with one or more hooks for hooking in a wheel of the bicycle in the load position.

In embodiments, there are as many hooks as there are guides or rails, or in other words, as many hooks as there are bicycles that can be transported.

Hooking the bicycle wheels in or behind the hooks in the load position ensures that the bicycles cannot roll or fall down again when the bicycle support is tilted towards the ground.

In embodiments, the bicycle support is provided with one or more supports that extend at right angles or at an angle relative to the plane formed by the bicycle support. Said supports will support the bicycle in the transport position such that said bicycle cannot topple over.

In embodiments, there are as many supports as there are guides or rails, or in other words, as many supports as there are bicycles that can be transported.

The supports are designed and dimensioned such that said supports can clamp or secure the tubes of a bicycle frame.

In embodiments, the aforementioned supports are collapsible in the direction of the bicycle support such that said supports come to lie in the plane formed by the bicycle support in the load position and/or the compact position.

In embodiments, the bicycle support is connected to the frame or the arm by a gas spring. Said gas spring will help the user when hinging the bicycle support between the load position and the transport position.

In this way the user, even in fully loaded condition, will be able to change the bicycle support with very little effort from the load position to the transport position.

In embodiments, the aforementioned locking means are such that said locking means are able to lock the rotation of the bicycle support relative to the arm or the frame.

In embodiments, the aforementioned coupling means of the bicycle carrier are provided with a tube frame that can be mounted against the wall of the vehicle.

Alternatively, said coupling means can also be provided with a trailer hitch for coupling with a towbar of a vehicle.

More alternatively, said coupling means can also be provided for attachment against an existing tube frame that is already located against the wall of the vehicle.

In embodiments, the bicycle carrier is substantially made from, for example, aluminium, stainless steel or another material suitable to this end for obtaining a light bicycle carrier, which also, once detached from the vehicle, is easy to manipulate and transport.

BRIEF DESCRIPTION OF THE DRAWINGS

With the intention of better showing the characteristics of the present disclosure, embodiments of a bicycle carrier according to the present disclosure are described hereinafter, by way of an example without any limiting nature, with reference to the accompanying drawings wherein.

DETAILED DESCRIPTION OF EMBODIMENTS

Figure 1:
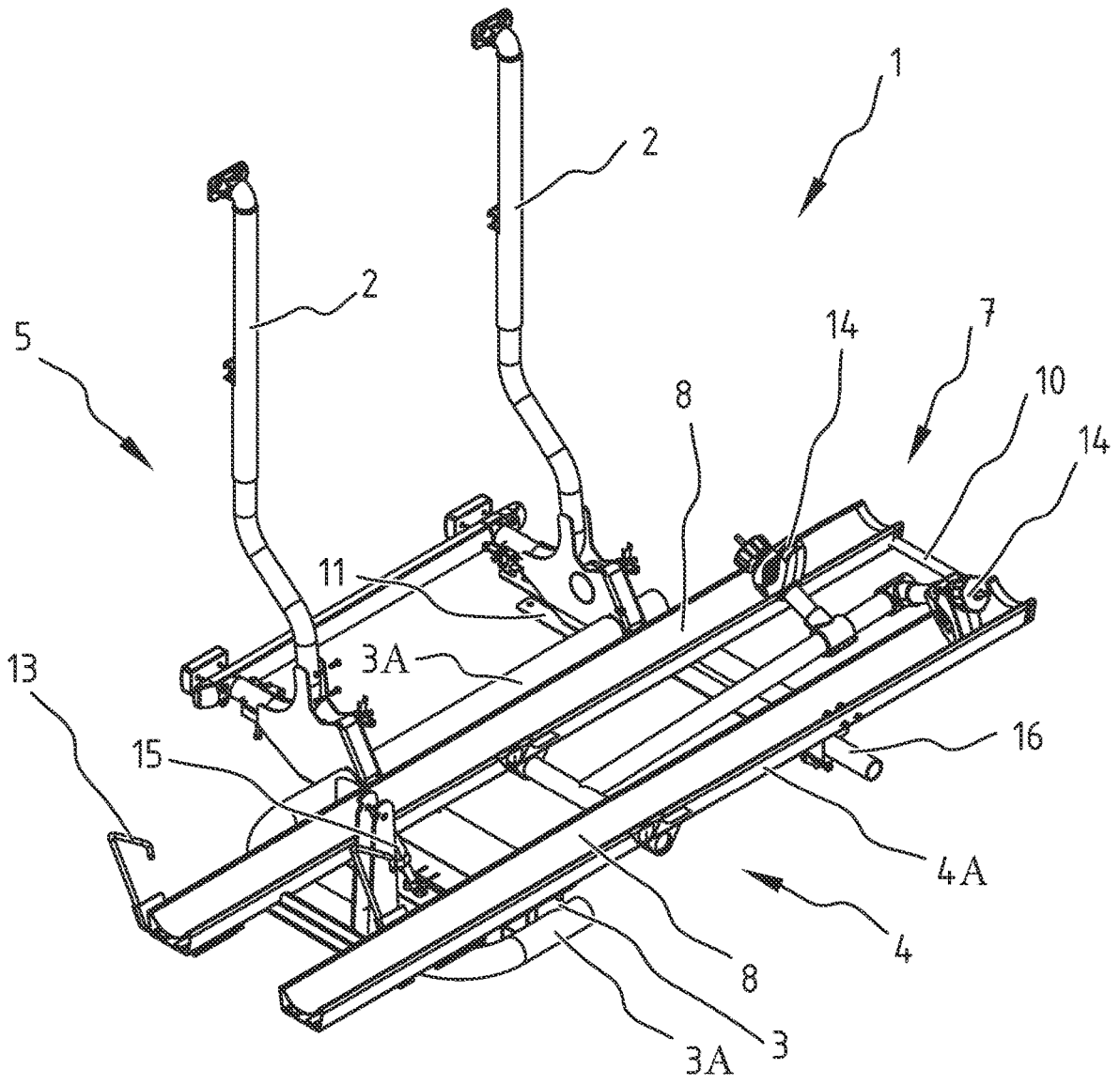
FIG. 1 schematically shows a perspective view of a bicycle carrier according to the present disclosure in the transport position.
Figure 2:
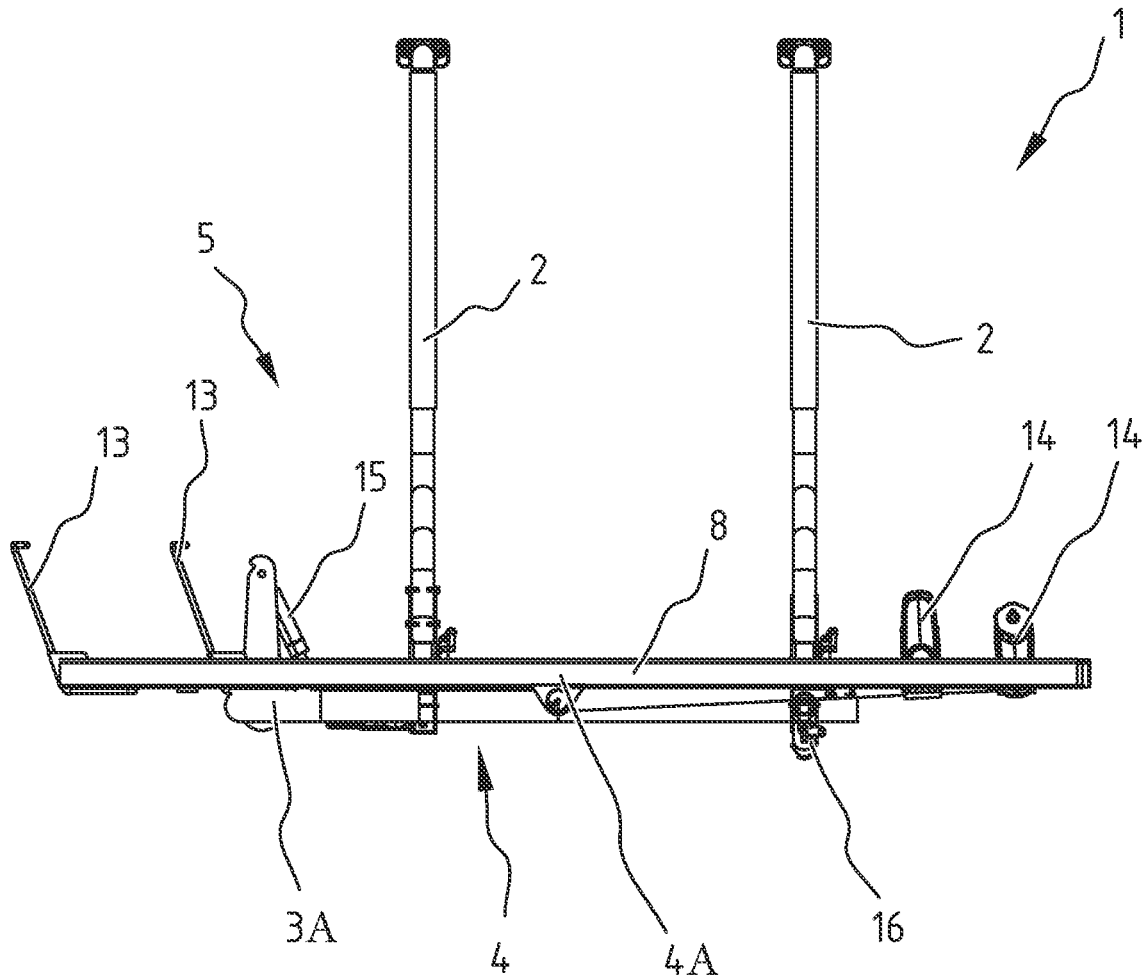
FIG. 2 shows a front view of the bicycle carrier according to FIG. 1.

The bicycle carrier 1 shown in FIGS. 1 and 2 is intended for mounting at the front or back against the wall of a vehicle and in this case is substantially made from aluminium.

Alternatively, the bicycle carrier 1 can also be manufactured from a different material suitable to this end.

Figure 5:
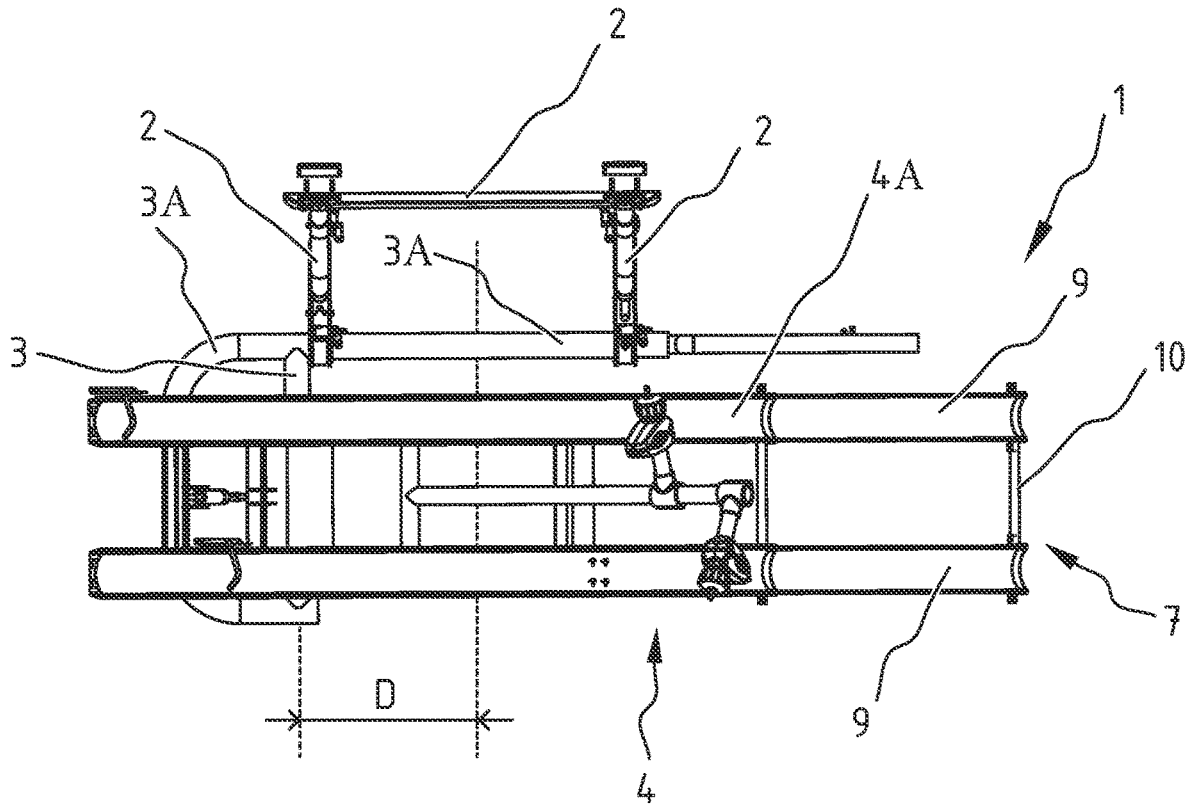
FIG. 5 shows a top view of the bicycle carrier according to FIG. 3.

The bicycle carrier 1 comprises coupling means 2 and a hinge shaft 3 which, at a distance D from the geometric centre of gravity of the coupling means 2, as shown in FIG. 5, is connected to the coupling means 2 by an arm 3A. However, it is possible that the hinge shaft 3 is provided on or is part of a frame that is connected to the coupling means 2.

The bicycle carrier 1 further comprises a bicycle support 4 that can hinge around the hinge shaft 3. In this embodiment, the bicycle support 4 is provided with a load-bearing structure 4A.

In this case, the bicycle carrier 1 is provided with coupling means 2 in the form of a tube frame 2 that can be mounted against the front or rear wall of the vehicle.

The hinge shaft 3 is located on a first side at the distance D from the virtual vertical plan that extends parallel to the hinge shaft 3 and through the geometric centre of gravity of the coupling means 2.

The free end of the load-bearing structure 4A facing the ground in the load position is located through the geometric centre of gravity of the coupling means 2 on a second side of the virtual vertical plane.

FIG. 2 shows more clearly that in this case the first side is located to the left of the geometric centre of gravity of the coupling means 2 while the second side is located to the right of the geometric centre of gravity of the coupling means 2.

However, it is also possible that the bicycle carrier 1 can be attached against an existing tube frame that is already present on the wall of the vehicle.

More alternatively, the coupling means 2 may be provided with a trailer hitch that can be attached to a towbar of the vehicle.

As in this example the coupling means, such as the tube frame, 2 includes two separate tubes 2 or rods, the aforementioned distance D is defined as being the distance between, on the one hand, the geometric centre of gravity of the coupling means, such as the tube frame, 2 and, on the other hand, the hinge shaft 3 between the arm 3A and the load-bearing structure 4A.

In the event that the coupling means 2 are provided with a trailer hitch it is clear that the distance D is defined as being the distance between, on the one hand, the centre of the trailer hitch and, on the other hand, the hinge shaft 3.

In embodiments, said distance D is greater than fifteen centimetres, or greater than thirty centimetre.

Figure 3:
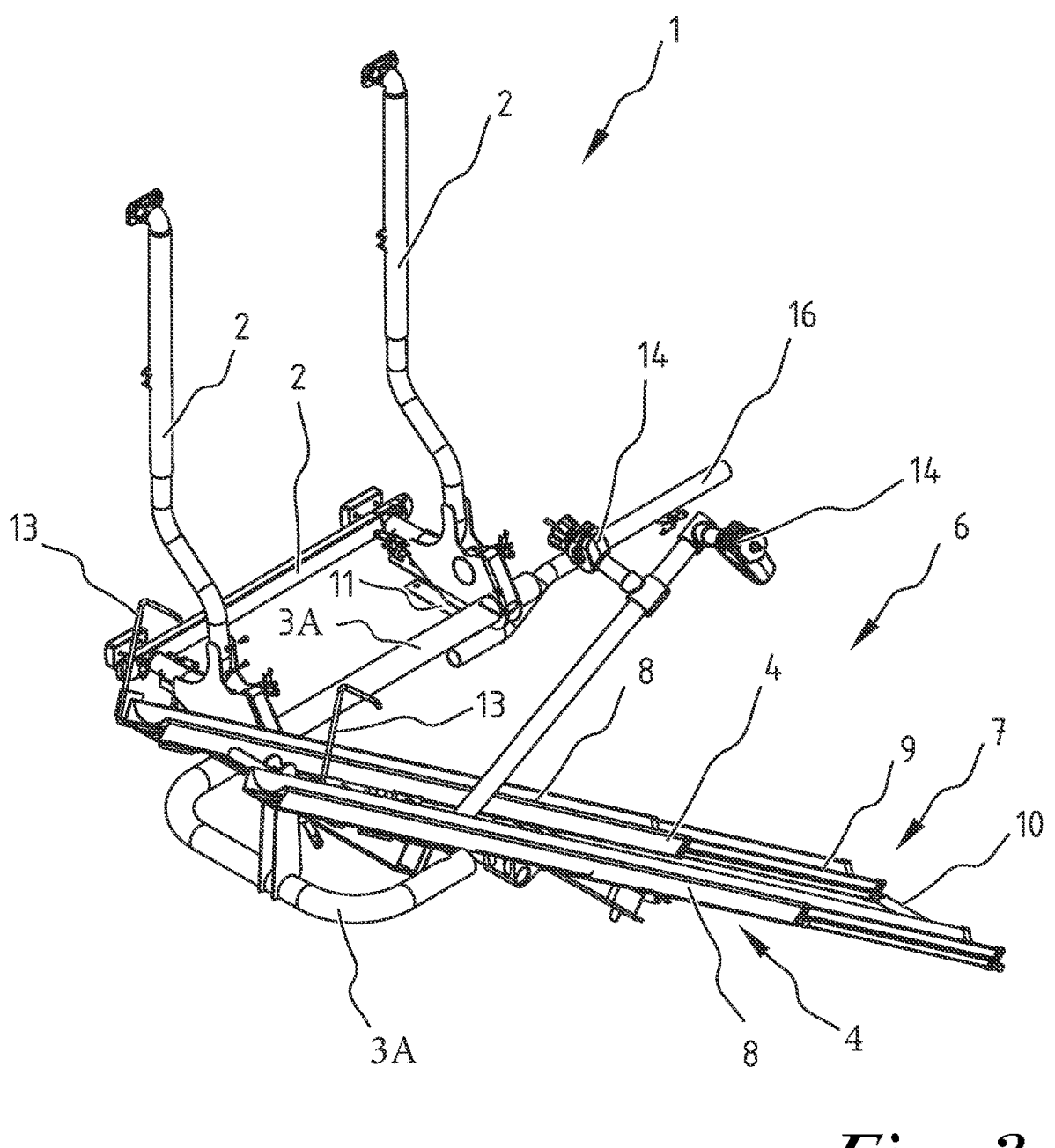
FIG. 3 schematically shows a perspective view of a bicycle carrier according to the present disclosure in the load position.
Figure 4:
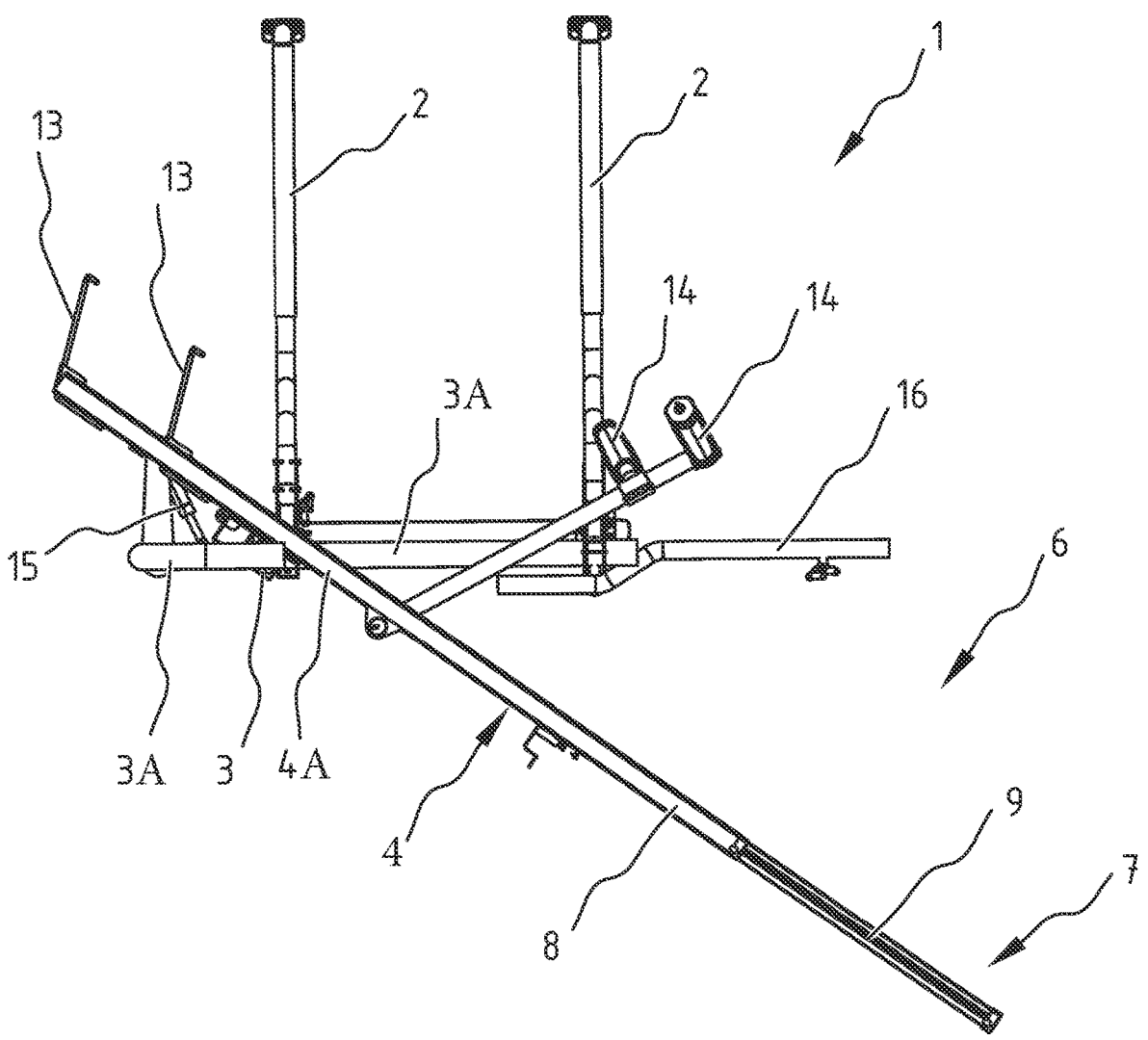
FIG. 4 shows a front view of the bicycle carrier according to FIG. 3.

Said load-bearing structure 4A can hinge between, on the one hand, the transport position 5 as shown here and, on the other hand, the load position 6, as shown in FIGS. 3, 4 and 5.

In the transport position 5, a free end 7 of the load-bearing structure 4A faces away from the ground.

The aforementioned distance D also ensures that the bicycle carrier 1 in both the transport position 5 and in the load position 6 remains as much as possible and, in embodiments, fully within the dimensions of the wall of the vehicle.

The plane formed by the bicycle support 4 or load-bearing structure 4A extends substantially horizontally in said transport position 5.

However, it is not excluded that the plane formed by the bicycle support 4 or load-bearing structure 4A inclines slightly in the transport position 5, for example less than 15° relative to the horizontal, less than 10° or less than 5° relative to the horizontal.

In the load position 6, said free end 7, in fact, faces towards the ground.

The incline of the plane formed by the bicycle support 4 or load-bearing structure 4A amounts to approximately 45° in this example.

However, in practice said incline can vary between 60° and 20°, but may be less than 50°, or less than 40° relative to the horizontal.

A smaller incline simplifies putting the bicycles onto the load-bearing structure 4A.

Said incline is related to the aforementioned distance D between the coupling means 2 and the hinge shaft 3 between the load-bearing structure 4A and arm 3A.

The greater the aforementioned distance D, the smaller the incline of the load-bearing structure 4A in the load position 6 can remain and the simpler it is to put or ride the bicycles onto the load-bearing structure 4A.

Furthermore, the greater the aforementioned distance D, the higher the bicycle carrier 1 can be mounted at the same incline.

This means the position of the attachment of the bicycle carrier to the coupling means is exceptionally flexible.

As is clearly visible in FIG. 1, the load-bearing structure 4A is provided in the longitudinal direction with, in this case, two guides 8 which extend parallel to each other. Said guides 8 support and guide the wheels of the bicycles (not shown in the figures for the sake of clarity).

However, the number of guides 8 is not limited to two. In theory the number of guides 8 is unlimited. In practice the number of guides 8 will vary between one and four usually.

In this embodiment, the guides 8 are executed as U-shaped rails 8.

Alternatively, said guides 8 can also be executed differently, for example as ramps.

FIGS. 3 to 5 clearly show that in this embodiment each guide 8 is provided with a carriage 9 that is telescopically retractable or extendable in the longitudinal direction of the guides 8. In FIGS. 3 to 5 the carriages are extended.

Said carriages 9 extend the guides 8 in the load position 6 such that the bicycle carrier 1 can be mounted higher than the known bicycle carriers 1 and at the same time the incline between the plane formed by the load-bearing structure 4A and the horizontal can be drastically limited in this way.

In other words, the telescopic carriages 9 simplify loading and unloading the bicycles onto the load-bearing structure 4A.

In the described example the carriages 9 are connected to each other by a crossbar 10 such that said carriages 9 move synchronously when retracting or extending.

For a person skilled in the art it is clear that said carriages 9, instead of extendable or telescopic, could also be separate components, that can be detachably attached to the guides 8.

For a person skilled in the art is it also clear that the guides 8 and/or the carriages 9 can be provided with clamping means for securing or clamping the wheels of the bicycle to the relevant guides 8 and/or carriages 9. Said clamping means can for example be executed as a strap with a buckle.

In this embodiment, the position where the arm 3A is connected to the coupling means 2 can be shifted in the longitudinal direction of the arm 3A. In this way, the bicycle carrier 1 can be made wider or narrower.

In this embodiment, the arm 3A is provided with a stop 11 which limits the rotation of the load-bearing structure 4A in the load position 6.

The position where the load-bearing structure 4A is connected to the arm 3A is fixed in this shown example, but it is not excluded that said position can be shifted in the direction of the coupling means 2. This increases the flexibility of the mounting position of the bicycle carrier 1.

In this example, the arm 3A is hingeably connected to the coupling means 2 such that the arm 3A can hinge between, on the one hand, the transport position 5 and, on the other hand, a compact position 12 whereby the load-bearing structure 4A is tilted in the direction of the coupling means 2. This situation is shown in FIGS. 6 and 7.

Figure 6:
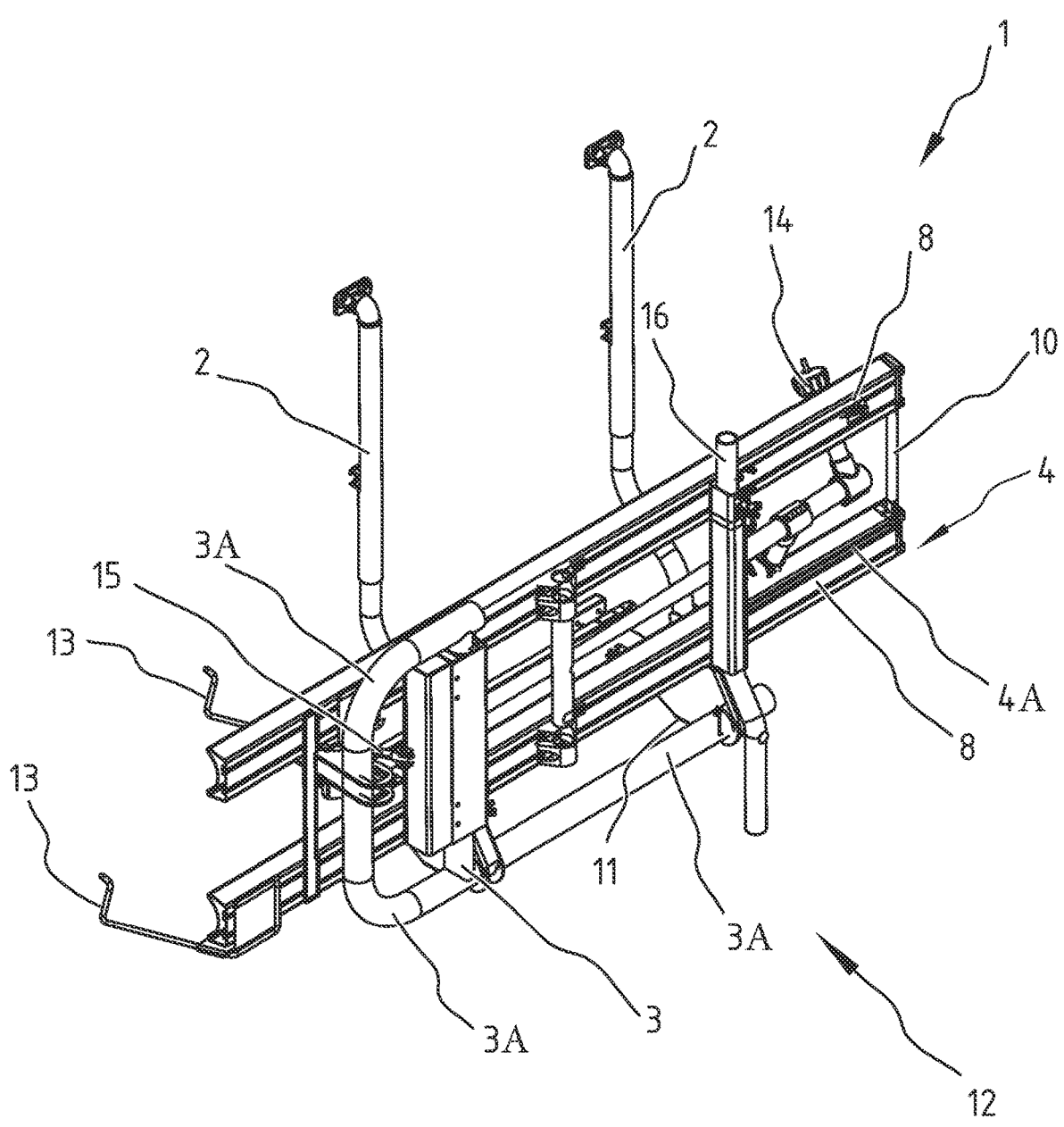
FIG. 6 schematically shows a perspective view of a bicycle carrier according to the present disclosure in the compact position.
Figure 7:
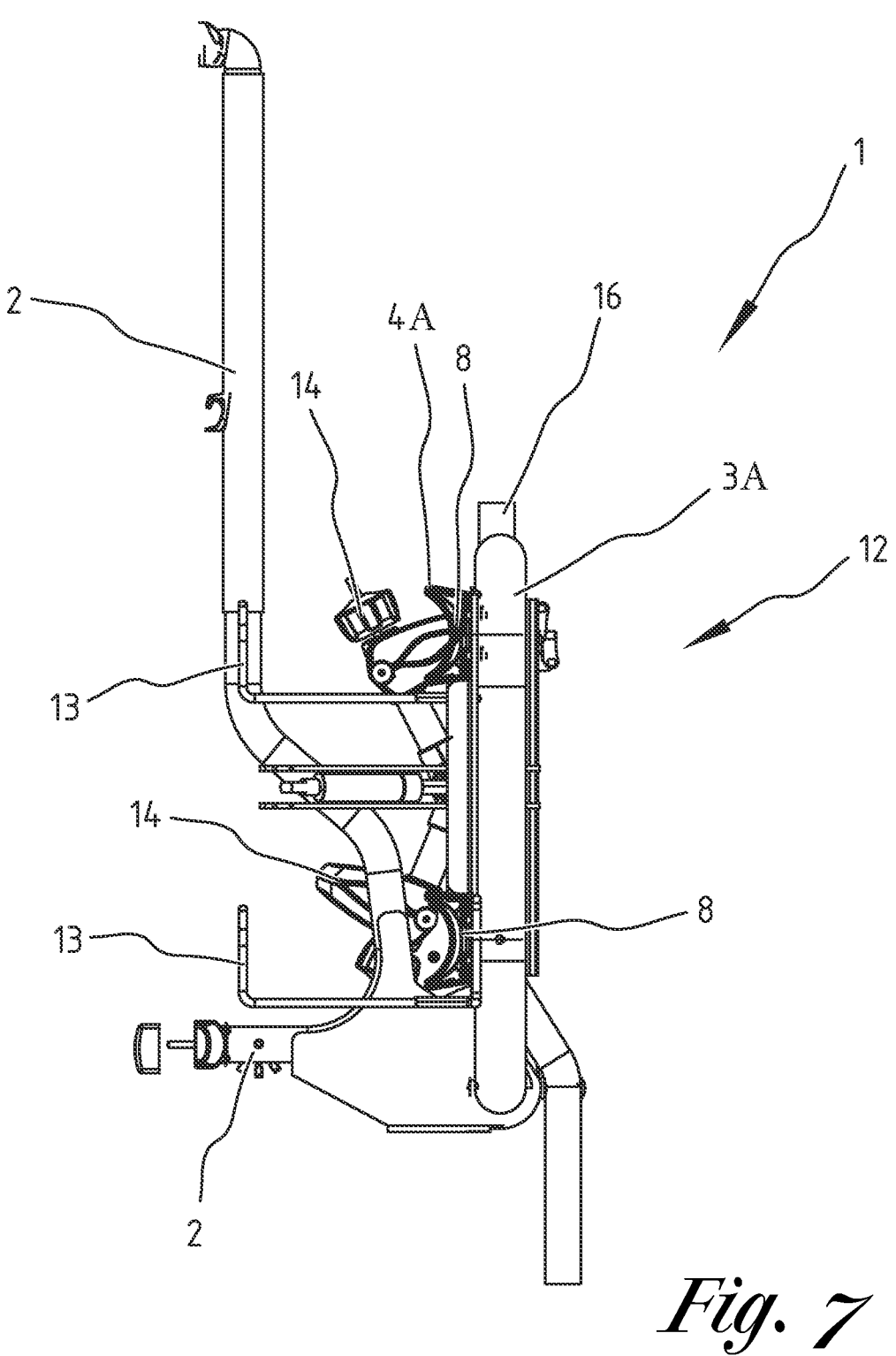
FIG. 7 shows a side view of the bicycle carrier according to FIG. 6.

FIGS. 6 and 7 clearly show that in this case the plane formed by the load-bearing structure 4A in the compact position 12 extends substantially in the vertical plane.

In this way a very compact bicycle carrier 1 is obtained in the unloaded condition.

However, it is not excluded that the angle between the plane formed by the load-bearing structure and the vertical is less than 30°, less than 15°, or less than 5°.

FIG. 4 clearly shows that the variant of the present disclosure shown is provided with two hooks 13 for hooking the bicycle into the load position 6. In this case, said hooks 13 are slideably connected to the guides 8. In this example, the position of said hooks 13 can be varied depending on the length of the bicycle.

However, the hooks 13 can also be staggered as shown in FIG. 4 to ensure that when transporting two bicycles, the pedals and/or the handlebars of the first bicycle are not in the way of the pedals and/or the handlebars of the second bicycle.

However, the number of hooks 13 is not limited to two. In practice the number of hooks 13 will typically be equal to the number of guides 8, or in other words, in practice the number of hooks 13 will be equal to the number of bicycles to be transported.

FIGS. 3 and 4 also clearly show that the load-bearing structure 4A is provided with two supports 14. In practice, the number of supports 14 is the same as the number of guides 8.

Said supports 14 are intended to be connected to the frame of the bicycle in the transport position 5. Said supports 14 secure or clamp the frames of the bicycles as it were, such that the bicycles cannot fall over during transport.

In this case, said supports 14 extend at an angle relative to the load-bearing structure 4A and are collapsible in the direction of the plane formed by the load-bearing structure 4A.

Particularly in the compact position 12 and also in the load position 6 it is handy that the supports 14 are collapsible in the direction of the load-bearing structure 4A.

FIGS. 4 and 5 clearly show that in this example the bicycle carrier 1 is equipped with a gas spring 15 that is applied between the load-bearing structure 4A and the arm 3A. Said gas spring 15 will help the user when hinging the load-bearing structure 4A between the load position 6 and the transport position 5. In this way hinging the load-bearing structure 4A only requires a very small effort.

Alternatively, said gas spring 15 can also be replaced by a classic spring or a different kind of spring or spring damper system.

In this embodiment, the location of the hinge shaft 3 around which the load-bearing structure 4A hinges is chosen such that in the load position 6 one wheel of the bicycle is put at least partially beyond the hinge shaft 3. The section of the weight of the bicycle that inclines beyond the hinge shaft 3 helps to move the load-bearing structure 4A from the load position 6 to the transport position 5.

The combination of this inclining weight in the load position 6 and the gas spring 15 ensures that with a minimum effort the loaded bicycle carrier 1 can be moved from the load position 6 to the transport position 5 and vice versa.

Consequently, the structure and more specifically the arm 3A and the load-bearing structure 4A of the bicycle carrier 1 can remain very light.

FIGS. 1, 3 and 6 clearly show that the bicycle carrier 1 also comprises locking means 16 that lock the rotation of the load-bearing structure 4A in the transport position 5 as shown in FIG. 1.

In this example the locking means 16 lock the rotation of the load-bearing structure 4A relative to the arm 3A.

In this embodiment the locking means 16 are executed as a collapsible rod 16 which is connected to the arm 3A. Said rod 16 supports the load-bearing structure 4A in the transport position 5 as shown in FIG. 1.

That same rod 16 is collapsed in the load position 6 as shown in FIG. 3 such that said rod 16 comes to lie parallel with the guides 8 of the load-bearing structure 4A and consequently no longer supports the load-bearing structure 4A.

However, it is not unthinkable that the rod 16 collapses upward or downward instead of to the side as shown in FIG. 3.

Alternatively, the rod 16 could also be removable instead of collapsible in the load position 6.

The rod 16 also has a function in the compact position 12 as shown in FIG. 6. In said position the rod 16 is collapsed upward and in this way locks the rotation of the arm 3A such that the plane formed by the load-bearing structure 4A extends substantially vertically.

An alternative variant of the bicycle carrier 1 is shown in FIGS. 8 to 12, in which the arm 3A is executed in two parts, i.e. a first part 17 and a second part 18.

Figure 8:
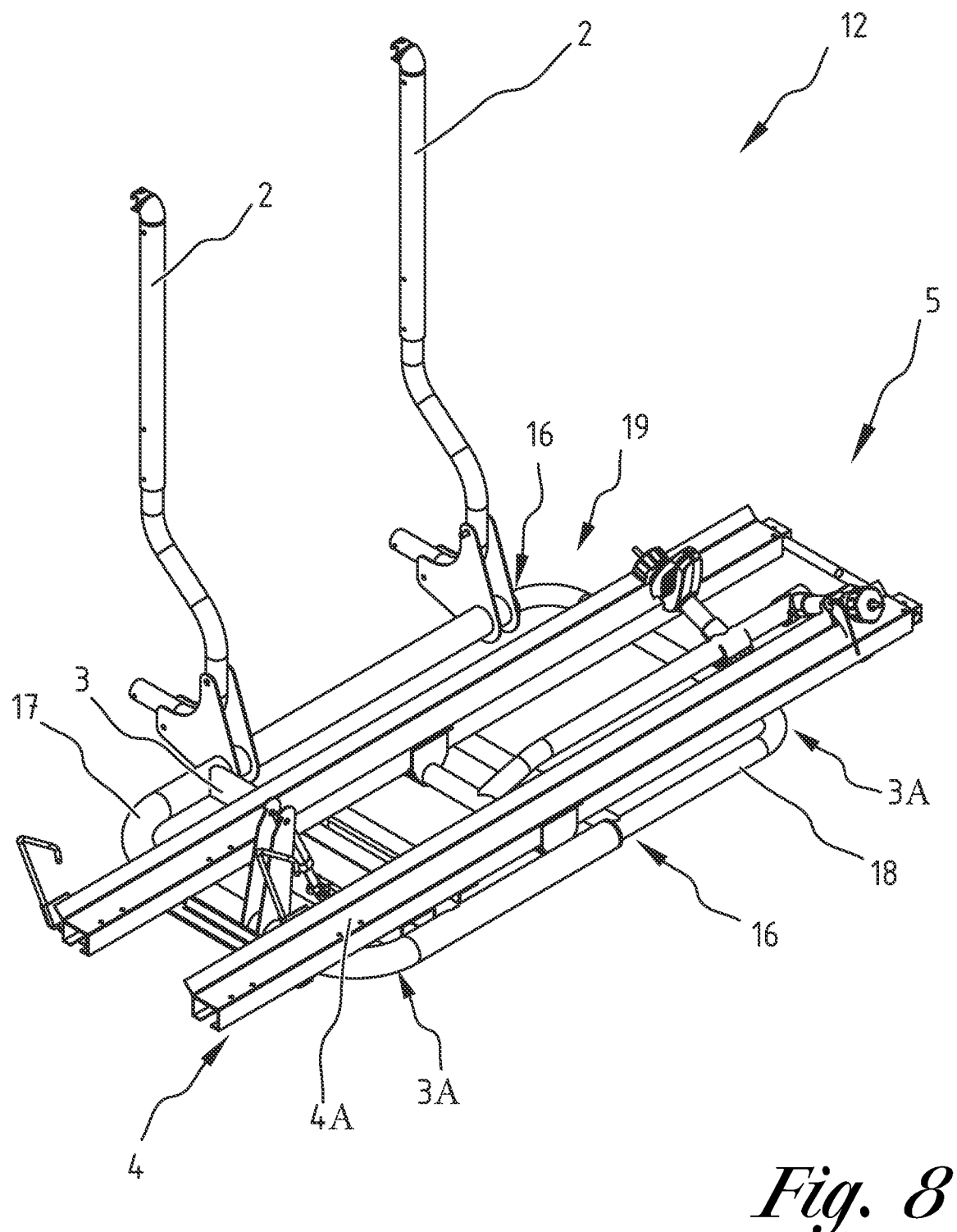
FIG. 8 schematically shows a perspective view of an alternative embodiment of a bicycle carrier with an arm in two parts, whereby the first part of the arm and the second part of the arm are coupled to each other in the transport position according to the present disclosure.

In the transport position, as shown in FIG. 8, the first part 17 of the arm 3A is coupled with the second part 18 of the arm 3A.

In this example, the two parts 17, 18 are executed as two tubes 17, 18 which can slide into each other such that a closed frame 19 is formed.

However, it is not excluded that the first part 17 and the second part 18 are detachably coupled or snapped into each other in a different way.

The first part 17 of the arm 3A is connected to the coupling means 2 and supports the load-bearing structure 4A, while the second part 18 is connected to the extendable or telescopic carriages 9.

The coupling of the first part 17 with the second part 18, as shown in FIG. 8, ensures the rotation of the load-bearing structure 4A is locked, in this way the first part 17 and second part 18 coupled to each other act as locking means 16.

Figure 9:
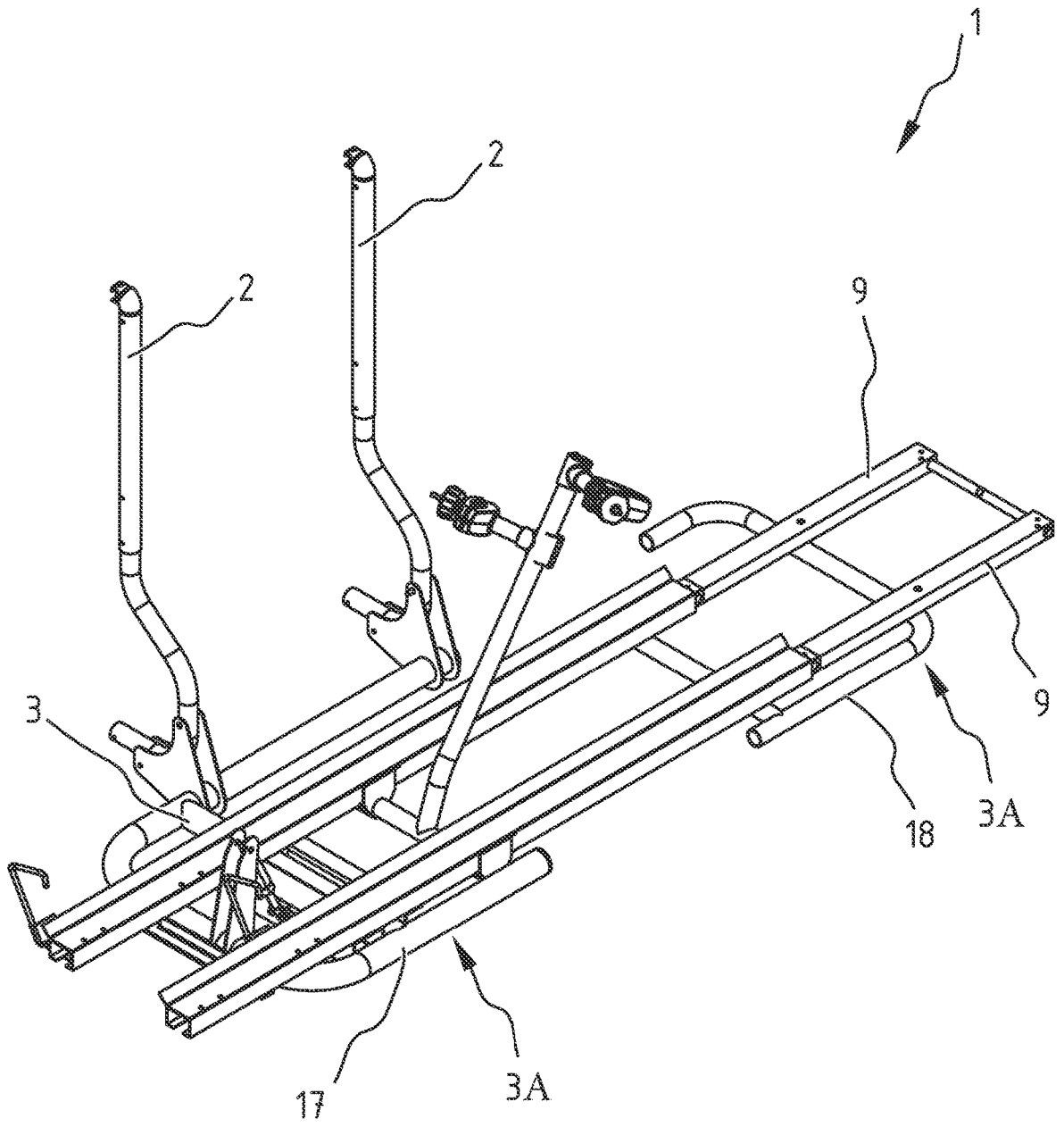
FIG. 9 shows the bicycle carrier of FIG. 8 whereby the first part of the arm and the second part of the arm are uncoupled.

In FIG. 9 the second part 18 is detached from the first part 17 or in other words the two parts 17, 18 are slid out of each other.

Although in this FIG. 9 the load-bearing structure 4A is still located horizontally, the rotation of the load-bearing structure 4A is no longer locked here.

Figure 10:
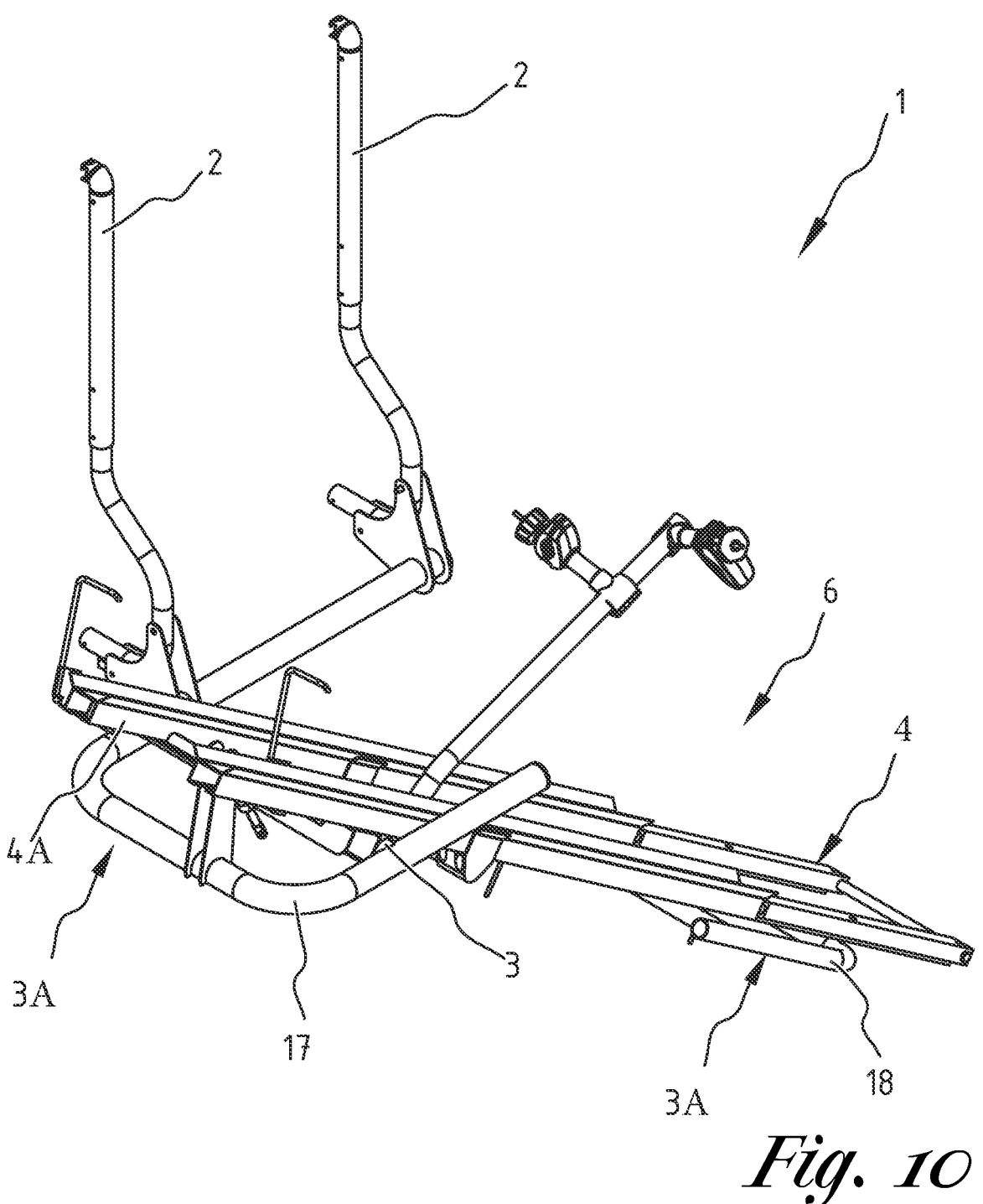
FIG. 10 shows the bicycle carrier of FIG. 9 but this time in the load position.

Indeed, as shown in FIG. 10, the load-bearing structure 4A is now rotated relative to the first part 17 with the carriages 9 facing downward or in the direction of the ground.

Figure 11:
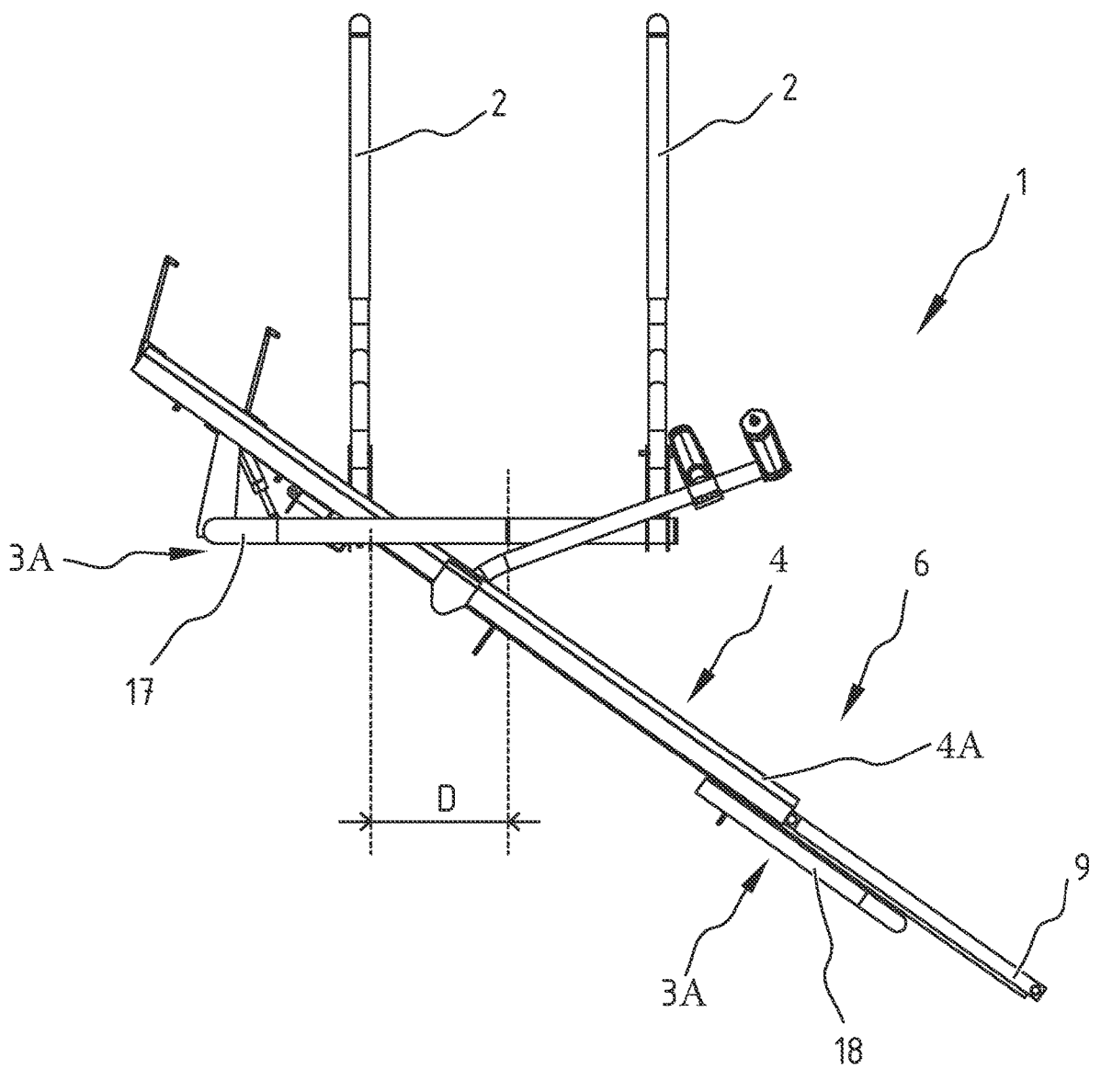
FIG. 11 shows a front view of the bicycle carrier according to FIG. 10.

As the second part 18 is coupled with the aforementioned carriages 9, extending the second part 18 from the first part 17 at the same time ensures that the carriages 9 are extended, this is shown better in the front view of the bicycle carrier 1, as shown in FIG. 11.

The bicycle carrier 1 is now located in the load position.

The use of the bicycle carrier 1 according to the present disclosure is very simple and as follows:

In a first step the bicycle carrier 1 is mounted against the vehicle using the coupling means 2. For the sake of simplicity we are assuming that the bicycle carrier 1 is initially in the transport position 5.

In a second step the bicycle carrier 1 is put in the load position 6 by collapsing the rod 16 that supports the load-bearing structure 4A or in the case of an arm that is executed in two parts, detaching the second part 18 of the arm 3A from the first part 17.

In an optional third step, the carriages 9, if any, are extended.

In a fourth step, the load-bearing structure 4A is tilted in the direction of the ground, and, in embodiments, the carriages 9, if any, touch the ground.

In a fifth step the bicycles are ridden onto the load-bearing structure 4A and when relevant the front wheels are hooked into the hooks 13 provided to that end.

In a sixth step the load-bearing structure 4A is returned to the transport position 5 by bringing the plane formed by the load-bearing structure 4A to a substantially horizontal position and subsequently supporting the load-bearing structure 4A with the rod 16 or by recoupling the first part 17 of the arm 3A by sliding it into the second part 18.

Bringing the load-bearing structure 4A to a horizontal position takes little effort using the gas spring 15.

In an optional seventh step the supports 14 are connected to the bicycle frames to prevent the bicycles from falling over.

The bicycle carrier 1 is now ready to transport the bicycles.

Unloading the bicycles is done by carrying out the six steps in reverse order.

Subsequently, if relevant the bicycle carrier 1 can be moved from the transport position 5 to the compact position 12 by moving the plane formed by the bicycle support 4 or load-bearing structure 4A substantially vertically and locking again using the rod 16 or using a clamp or connection between the coupling means 2 and the second part 18.

It is understood that the coupling means 2, the arm 3A and the load-bearing structure 4A can be executed in many different ways. The locking means 16 as shown and described in the figures are also only examples of possibilities.

Although the load-bearing structure 4A in the figures shown rotates clockwise, the present disclosure also relates to a bicycle carrier 1 whereby the load-bearing structure 4A rotates counter-clockwise.

Alternatively, the locking means 16 can also be provided on the wall of the vehicle, for example a collapsible rod which is applied at a distance from the aforementioned hinge point against or on the wall.

More alternatively, the locking means 16, in the case of, for example, the coupling means 2 in the form of a tube frame 2, can be provided with a rod that can be attached to the towbar of the vehicle and supports the load-bearing structure 4A in the transport position 5.

The present disclosure also relates to a bicycle carrier 1 whereby a hinge shaft 3 of the bicycle support 4 is located on the level of, or near, the coupling means 2 and is directly or indirectly connected thereto. Indeed, for the person skilled in the art it is clear that the aforementioned distance D can equal zero if the coupling means 2, for example in case of the tube frame 2, are not provided centrally on or against the wall of the vehicle. In such case the arm 3A may possibly be left out and the bicycle support 4 can be directly or indirectly hingedly connected to the coupling means 2.

In other words, the incline of the plane formed by the bicycle support 4 in the load position 6 can be kept small by, on the one hand, providing a distance D between the coupling means 2 and the hinge point of the bicycle support 4 in the case of centrally positioned coupling means 2 or, on the other hand, providing a distance between the position of the coupling means 2 on the wall and the central vertical axis through the relevant wall of the vehicle. It goes without saying that a combination of both distances is also possible.

In an alternative embodiment, the hinge shaft 3 is provided on or is part of a frame that is connected to the coupling means 2. The bicycle support 4 then comprises one or more rails 8 that are applied in the frame and can hinge around the hinge shaft 3 between the load position 6 and the transport position 5.

If relevant, said rails 8 can then be aligned with the rails 8 of the variants as shown in FIGS. 1 to 11, while the frame, if relevant, can be aligned with the load-bearing structure 4A with the difference that the frame does not hinge relative to the hinge shaft 3 but only the rails 8 hinge relative to the hinge shaft 3.

The present disclosure is not limited to the embodiments described as an example and shown in the drawings, but a bicycle carrier according to the present disclosure can be realised in all kinds of forms and dimensions, without departing from the scope of the present disclosure.

What is claimed is:

1. A bicycle carrier, comprising coupling means for mounting to a vehicle, wherein the bicycle carrier is further provided with:

a hinge shaft which, at a distance from a geometric center of gravity of the coupling means, is connected to the coupling means;

a bicycle support which can hinge around the hinge shaft between, on one hand, a load position whereby a free end of the bicycle support faces towards the ground and, on the other hand, a transport position whereby the free end of the bicycle support is spaced apart from the ground;

whereby the bicycle carrier is provided with a locking means for locking a rotation of the bicycle support in the transport position and whereby a hingeable connection of the bicycle support with the hinge shaft is located on a first side at the distance from a virtual vertical plane that extends parallel to the hinge shaft and through the geometric center of gravity of the coupling means, and the free end of the bicycle support which in the load position faces towards the ground is located on a second side of the virtual vertical plane through the geometric center of gravity of the coupling means.

2. The bicycle carrier according to claim 1, wherein the hinge shaft is provided on or is part of a frame that is connected to the coupling means, whereby the bicycle support comprises one or more rails that are hingeably applied in the frame and can hinge around the hinge shaft between the load position and the transport position.

3. The bicycle carrier according to claim 1, wherein the hinge shaft is connected to the coupling means by an arm and whereby the bicycle support comprises a load-bearing structure that can hinge around the hinge shaft between the load position and the transport position.

4. The bicycle carrier according to claim 3, wherein a position where the arm is connected to the coupling means may be shifted in a longitudinal direction of the arm.

5. The bicycle carrier according to claim 3, wherein the arm is provided with a stop such that a rotation of the load-bearing structure in the load position and/or the transport position is limited.

6. The bicycle carrier according to claim 3, wherein the bicycle support comprises one or more rails that are hingeably applied in the arm and can hinge around the hinge shaft between the load position and the transport position, wherein the rails are provided with one or more carriages which are telescopically retractable or extendable in a longitudinal direction of the rails.

7. The bicycle carrier according to claim 6, wherein the arm is executed in two parts, whereby a first part is connected to the coupling means and is connected to the load-bearing structure and a second part is provided with the extendable or telescopic carriages, wherein the first part and second part in the transport position are connected to each other, snapped into each other or slid into each other and in this way act as the locking means for locking a rotation and supporting the load-bearing structure in the transport position and whereby the first part and the second part are not connected to each other in the load position such that the load-bearing structure can rotate relative to the first part of the arm.

8. The bicycle carrier according to claim 3, wherein the locking means lock a rotation of the bicycle support relative to the arm in the transport position.

9. The bicycle carrier according to claim 3, wherein the arm is hingeably connected to the coupling means between the transport position and a compact position whereby the bicycle support is tilted in a direction of the coupling means.

10. The bicycle carrier according to claim 9, wherein the locking means lock a rotation of the arm relative to the coupling means in the compact position.

11. The bicycle carrier according to claim 9, wherein the locking means is a removable or collapsible rod which is or may be connected to the arm and which supports the bicycle support in the transport position and whereby the rod is removed or collapsed and does not support the bicycle support in the compact position or the load position.

12. The bicycle carrier according to claim 3, wherein a spring or a gas spring is provided between the bicycle support and the arm which helps a user when hinging the bicycle support between the load position and the transport position.

13. The bicycle carrier according to claim 1, the distance D is greater than fifteen centimetres.

14. The bicycle carrier according to claim 1, wherein an incline of a plane formed by the bicycle support in the load position is less than 60° relative to a horizontal.

15. The bicycle carrier according to claim 1, wherein the coupling means of the bicycle carrier are provided with a trailer hitch for coupling with a towbar of the vehicle or that the coupling means are provided with a tube frame provided to that end or means for attaching against a tube frame on a front or rear wall of the vehicle.

16. A bicycle carrier configured to be mounted to a vehicle, the bicycle carrier comprising:

a tube frame configured to be mounted to the vehicle;

an arm coupled to the tube frame;

a hinge shaft connected to the tube frame by the arm, the hinge shaft is spaced apart a distance from a geometric center of gravity of the tube frame;

a bicycle support hingedly connected to the hinge shaft for rotation between a load position and a transport position, in the load position a free end of the bicycle support faces towards the ground and in the transport position the free end of the bicycle support is spaced apart from the ground; and a locking rod connected to the arm, the locking rod moveable between a first position and a second positon, in the first position the locking rod is configured to support the bicycle support in the transport position to inhibit movement of the bicycle support from the transport position towards the load position, and in the second position the locking rod no longer supports the bicycle support in the transport position to permit movement of the bicycle support from the transport position towards the load position, wherein a hingeable connection of the bicycle support with the hinge shaft is located on a first side at the distance from a virtual vertical plane that extends parallel to the hinge shaft and through the geometric center of gravity of the tube frame, and the free end of the bicycle support is located on a second side of the virtual vertical plane through the geometric center of gravity of the tube frame.

\* \* \* \* \*